(12) United States Patent
Kargl et al.

(10) Patent No.: US 9,004,360 B2
(45) Date of Patent: Apr. 14, 2015

(54) CONTACTLESS COMMUNICATION VIA A PLURALITY OF INTERFACES

(75) Inventors: Walter Kargl, Graz (AT); Josef Haid, Graz (AT); Albert Missoni, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1278 days.

(21) Appl. No.: 12/481,967

(22) Filed: Jun. 10, 2009

(65) Prior Publication Data

US 2010/0314445 A1 Dec. 16, 2010

(51) Int. Cl.
| G06K 7/08 | (2006.01) |
| G06K 19/06 | (2006.01) |
| G06K 7/10 | (2006.01) |
| G06K 7/00 | (2006.01) |
| H02J 5/00 | (2006.01) |

(52) U.S. Cl.
CPC .......... *G06K 7/0008* (2013.01); *G06K 7/10217* (2013.01); *H02J 5/005* (2013.01)

(58) Field of Classification Search
USPC ................ 235/451, 492, 380; 340/10.1, 10.2, 340/572.1, 572.2
See application file for complete search history.

(56) References Cited

U.S. PATENT DOCUMENTS

| 7,051,933 | B1 * | 5/2006 | Nagaoka et al. ............... 235/451 |
| 7,425,895 | B2 * | 9/2008 | Stobbe et al. ............. 340/572.1 |
| 7,876,225 | B2 | 1/2011 | Mickle et al. |
| 8,072,314 | B1 * | 12/2011 | Kuzma et al. ................ 340/10.4 |
| 2004/0099746 | A1 * | 5/2004 | Norton ........................... 235/492 |
| 2005/0237160 | A1 | 10/2005 | Nolan et al. |
| 2006/0049947 | A1 * | 3/2006 | Forster ....................... 340/572.3 |
| 2006/0202032 | A1 * | 9/2006 | Kricorissian ................ 235/435 |
| 2006/0238301 | A1 * | 10/2006 | Wu et al. ...................... 340/10.1 |
| 2006/0244676 | A1 * | 11/2006 | Uesaka .......................... 343/895 |
| 2006/0280149 | A1 * | 12/2006 | Kuhl et al. ..................... 370/338 |
| 2007/0075139 | A1 * | 4/2007 | Hammond et al. ........... 235/435 |
| 2007/0120670 | A1 * | 5/2007 | Torchalski ................. 340/572.1 |
| 2007/0205873 | A1 | 9/2007 | Mickle et al. |
| 2008/0068172 | A1 * | 3/2008 | Fischer ....................... 340/572.2 |
| 2009/0195812 | A1 * | 8/2009 | Park .............................. 358/1.15 |
| 2010/0093429 | A1 * | 4/2010 | Mattice et al. ................... 463/25 |
| 2010/0148965 | A1 * | 6/2010 | Alexis et al. ............... 340/572.1 |
| 2010/0210207 | A1 | 8/2010 | Goto et al. |
| 2011/0018712 | A1 | 1/2011 | Luetzelberger |

FOREIGN PATENT DOCUMENTS

| JP | 9-001968 A | 1/1997 |
| JP | 2000-011105 A | 1/2000 |
| JP | 2003-536302 A | 12/2003 |
| JP | 2004-048624 A | 2/2004 |
| JP | 2006-025385 A | 1/2006 |
| JP | 2008-009910 A | 1/2008 |
| JP | 2008-503826 A | 2/2008 |
| JP | 2008-072243 A | 3/2008 |
| JP | 2008-084307 A | 4/2008 |
| JP | 2010-050515 A | 3/2010 |

* cited by examiner

*Primary Examiner* — Tuyen K Vo
(74) *Attorney, Agent, or Firm* — Schiff Hardin LLP

(57) ABSTRACT

A contactless communication device including an energy interface configured to activate the contactless communication device or a contactless communication partner based on a first carrier signal; and a contactless high speed data interface configured to enable data communication between the contactless communication device and the contactless communication partner based on a second carrier signal having a frequency greater than a high frequency (HF).

23 Claims, 3 Drawing Sheets

CONTACTLESS COMMUNICATION VIA A PLURALITY OF INTERFACES

BACKGROUND

The present invention is directed to a contactless communication device having plurality of contactless interfaces, and more specifically, to a contactless communication device having an interface configured to provide power and an interface configured to provide high speed data communication.

The basic components of a contactless card system are a contactless reader and the contactless card. The contactless reader, also known as a Phase Coupled Device (PCD), includes an antenna electrically coupled to an electronic circuit. The contactless card, also known as a smart card, a tag, a Proximity Integrated Circuit Chip (PICC), or a Radio Frequency Identification (RFID) tag, has an inductive antenna and an integrated circuit electrically coupled to the inductive antenna.

When the contactless card penetrates a transmission field of the reader, the reader antenna transmits to the contactless card a carrier signal, which generates a radio frequency field to supply the contactless card with power and data, which is achieved by amplitude modulation of the carrier signal. In return, the contactless card transmits data by load modulating the carrier signal. This load modulated signal is detected by the reader antenna. The communication between the reader and the contactless card may be defined by any of numerous ISO (International Organization for Standardization) standards, such as 14443 Type A/B/C, 15693, 18000, etc.

The ISO communications mentioned above are limited to data communication at speeds of 848 kBit/s, with ongoing specification work for greater than 10 MBit/s. Communication devices built according to these standards are in general radio frequency powered. The carrier transmission field is not only used for data communication, but also for powering the card.

Other standards, such as UHF, WLAN, etc., have higher bit transfer rates. However, the electromagnetic fields of these standards are too weak to power contactless devices in the mA range.

DETAILED DESCRIPTION

Figure 1:
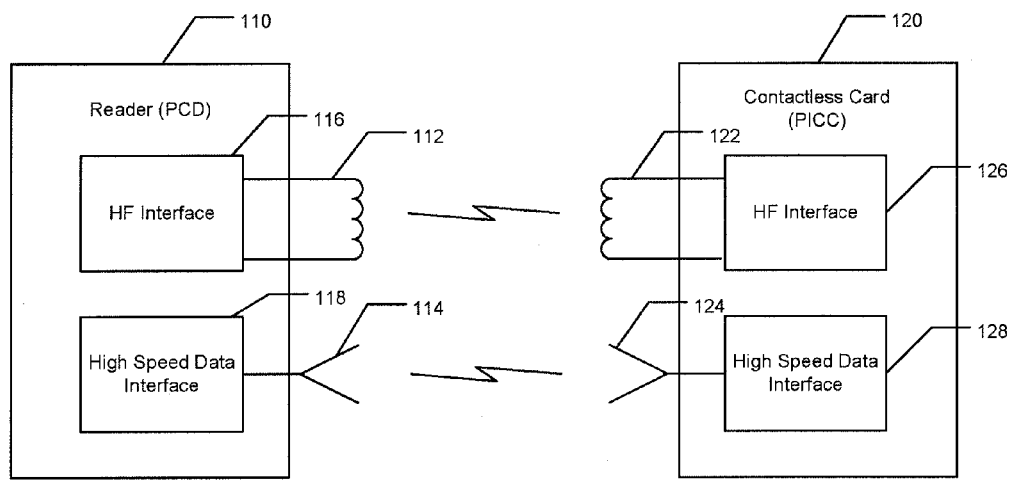
FIG. 1 is a circuit diagram of a contactless system having a contactless reader and a contactless card according to an exemplary embodiment.

FIG. 1 is a circuit diagram of a contactless system 100 having reader, or PCD, 110 and contactless card, or PICC, 120 in accordance with an exemplary embodiment. Reader 110 includes high frequency (HF) antenna 112 coupled to HF interface 116, and high speed data antenna 114 coupled to high speed data interface 118. Similarly, contactless card 120 includes HF antenna 122 coupled to HF interface 126, and high speed data antenna 124 coupled to high speed data interface 128. It should be understood that additional components that are commonly found in readers and contactless cards, such as internal circuitry, oscillators, modulating components, demodulating components, microprocessors, memory, rectifiers and the like, are contemplated. Such components have not been described or shown so as not to unnecessarily obscure the description.

Reader 110 and contactless card 120 have been known to communicate at a frequency in the HF range using HF interfaces 116, 126 and HF antennas 112, 122. HF frequencies are between 3 and 30 MHz. Employing protocols defined by the aforementioned ISO standards, data at this frequency is transmitted at a speed of up to approximately 848 kBits/s. More specifically, reader 110's HF interface 116 generates a carrier signal modulated with data, and HF antenna 112 transmits this modulated carrier signal. The modulated carrier signal generates an HF transmission field. When contactless card 120 penetrates the HF transmission field, HF antenna 122 detects and receives the modulated carrier signal, and HF interface 126 rectifies and demodulates the carrier signal to generate power and recover the data. Contactless card 120 may then respond to reader 110 by modulating the carrier signal with new data and transmitting the newly modulated carrier signal back to reader 110 via HF antenna 126. This communication between the reader and the contactless card may be defined by any of numerous ISO standards, such as those mentioned above.

In the exemplary embodiment, interfaces 116, 126 are configured to process a carrier signal transmitted at a frequency in the HF range. The invention is not necessarily limited in this respect. Interfaces 116, 126 may be configured to communicate via a carrier signal at any other frequency that can provide sufficient power as is suitable for the intended purpose.

High data transfer speeds between reader 110 and contactless card 120 can occur using high speed data antennas 114, 124 and high speed data interfaces 118, 128 in accordance with an exemplary embodiment. High speed data interfaces 118, 128 are configured to process a carrier signal transmitted at a frequency greater than a high frequency (HF), and up to a frequency in the GHz range. In an exemplary embodiment, reader 110's high speed data interface 118 and contactless card 120's high speed data interface 128 are each configured to communicate via a carrier signal at a frequency in the ultra high frequency (UHF) range, which is in a range of 300 MHz to 3 GHz.

Figure 2A:
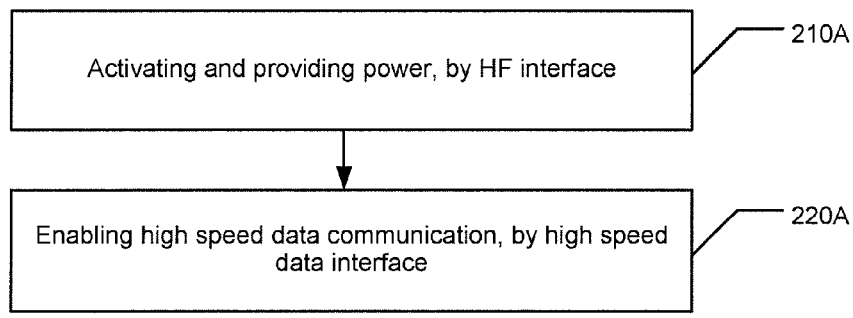
FIG. 2A is a flowchart of a method for contactless communication according to an exemplary embodiment.

FIG. 2A is a flowchart of a method for high speed contactless communication according to an exemplary embodiment. First, HF interfaces 116, 126 activate contactless card 120. (Step 210A.) More specifically, reader HF interface 116 modulates a carrier signal at a frequency in the HF range as described above, and transmits the modulated carrier signal via HF antenna 112. When contactless card 120 penetrates the HF transmission field of the HF carrier signal, card HF antenna 122 detects and receives the modulated carrier signal, and card HF interface 126 rectifies and demodulates the carrier signal to obtain power, and possibly data, used to activate contactless card 120. HF interfaces 116, 126 are essentially energy interfaces for powering contactless card 120, but they are also capable of enabling communication. Again, in an exemplary embodiment, HF interfaces 116, 126 process a carrier signal that is transmitted at a frequency that is in the HF frequency range, but it is possible for the frequency to be outside this exemplary range given that sufficient power can be provided.

After contactless card 120 is activated, high speed data interfaces 118, 128 are activated to enable high speed data communication between reader 110 and contactless card 120. (Step 220A.) High speed data interface 128 of card 120 may be activated by HF interface 126 of card 120. Alternatively, high speed data interface 128 of contactless card 120 may be activated based on communications with high speed data interface 118 of reader 110 after contactless card 120 is activated. High speed data interfaces 118, 128 communicated via a carrier signal operating at a frequency greater than a high frequency (HF), for example in the GHz range, thereby allowing data speeds that significantly exceed 848 kBits/s. Again, in an exemplary embodiment, the high speed data interfaces 118, 128 are configured to process a carrier signal operating at a frequency in the ultra high frequency (UHF) range. Otherwise, high speed data interfaces 118, 128 transmit data between reader 110 and contactless card 120 in a manner similar to HF interfaces 116, 126, that is, by modulating data on a carrier signal, but at a higher frequency than HF interfaces 116, 126. While reader 110 and contactless card 120 communicate via high speed interfaces 118, 128, reader 110 may continue to supply power to contactless card 120 via HF interfaces 116, 126 by providing power via a carrier signal at a high frequency (HF).

Figure 2B:
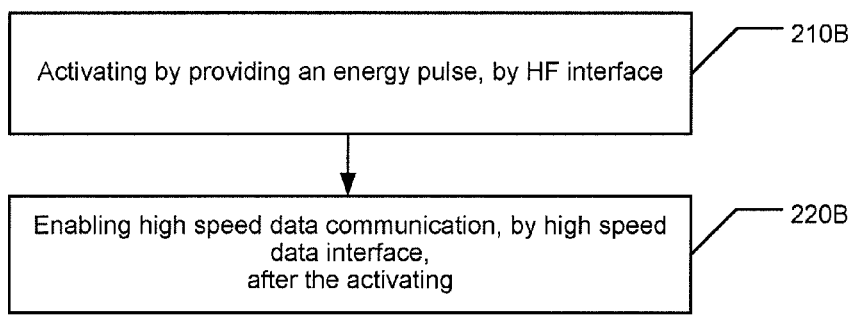
FIG. 2B is a flowchart of a method for contactless communication according to another exemplary embodiment.

FIG. 2B is a flowchart of a method for contactless communication according to another exemplary embodiment. This method is similar to that of FIG. 2A, except that contactless card 120 is activated by an energy pulse (Step 210B), and then communication is immediately switched to high speed data communication with substantially no additional power being provided by reader 110 to contactless card 120 (Step 220B). More specifically, reader HF interface 116 modulates a carrier signal at a frequency in the HF range with polling data, and transmits the modulated carrier signal via HF antenna 112. When contactless card 120 penetrates the HF transmission field of the HF carrier signal, card HF antenna 122 receives the modulated carrier signal, and card HF interface 126 rectifies the carrier signal to obtain power in the form of an energy pulse, thereby activating contactless card 120. (Step 210B.) HF interface 116 then ceases to transmit a carrier signal, and instead, high speed data interfaces 118, 128 enable high speed data communication between reader 110 and contactless card 120 as discussed above. (Step 220B.) Contactless card 120 then obtains its power from another source, such as an internal battery (not shown).

Figure 2C:
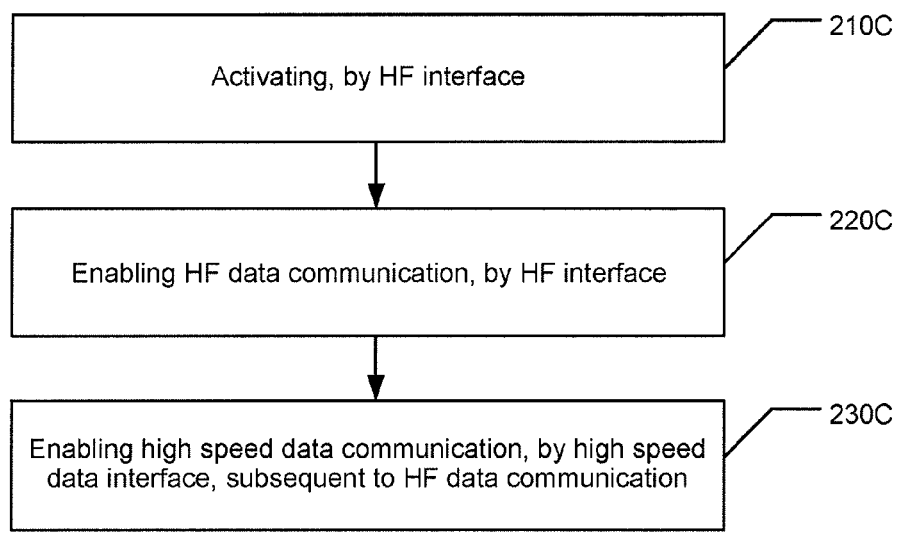
FIG. 2C is a flowchart of a method for contactless communication according to another exemplary embodiment.

FIG. 2C is a flowchart of a method for contactless communication according to another exemplary embodiment. This method is similar to that of FIG. 2A, except that in addition to data communication via high speed data interfaces 118, 128, there is also data communication via HF interfaces 116, 126. As in the method of FIG. 2A, HF interfaces 116, 126 are configured to activate contactless card 120. (Step 210C.) Then, data communication is enabled at a high frequency (HF) between reader 110 and contactless card 120 by HF interfaces 116, 126, in the manner as discussed above. (Step 220C.) Subsequently, high speed data communication is enabled at a frequency higher than a high frequency (HF) between reader 110 and contactless card 120 by high speed data interfaces 118, 128 in the manner discussed above. As a result, data communication can take place via HF interfaces 116, 126 and/or high speed data interfaces 118, 128 concurrently, consecutively, alternatingly, or in any order suitable.

As described above with respect to FIG. 2A, high speed data interface 128 may be activated by HF interface 126, or may alternatively be activated based on communications with high speed data interface 118. Further, during high speed communication, reader 110 may continue to supply power to contactless card 120 via HF interfaces 116, 126 by providing power via a carrier signal at a high frequency (HF).

While each of reader 110 and contactless card 120 have been described as having a single HF interface 116, 126 and a single high speed data interface 118, 128, the invention is not limited in this respect. Reader 110 and contactless card 120 may have any number of HF interfaces or high speed data interfaces as is suitable for the intended purpose.

Also, each of reader 110 and contactless card 120 has been described as having separate HF and high speed data antennas. Alternatively, the HF and high speed data antennas may be combined into a single antenna capable of receiving signals at all operating frequencies.

While high speed data interfaces 118, 128 are provided mainly for their high speed communication capabilities, they may additionally provide power to contactless card 120. It is appreciated, however, that due to the high frequency, any power supplied by high speed data interfaces 118, 128 would be significantly less than that supplied by HF interfaces 116, 126.

The invention provides a number of advantages. High speed data interfaces 118, 128 need only manage data transfer. Also, high speed data interface 128 of contactless card 120 may be powered by HF interface 126 and need not be powered by any other energy sources. It is appreciated, however, that the invention is not meant to be limited in this respect. High speed data interface 128 may be powered additionally or alternatively by another energy source.

While the exemplary embodiment describes a contactless card, the invention is not limited in this respect. Contactless card 120 need not be in a form of a card. For example, contactless card 120 may be a digital camera coupled to a personal computer. In such a case, power delivery and setup of the communication is provided via HF interfaces 116, 126, which might be an interface as described above by ISO 14443. The protocol then switches to high speed data interfaces 118, 128 to transfer the photos in accordance with a technology such as USB technology, as is known.

Alternatively, contactless card 120 may be a contactless High Density Subscriber identity Module (HD-SIM) for a mobile phone. The data on a HD-SIM is in the range of Mbytes up to GBytes. However, it is possible to power the card by HF interfaces 116, 126 and transfer a large amount of data via high speed data interfaces 118, 128.

Alternatively, contactless card 120 may be a used to replace on-board printer circuit board (PCB) communication. Instead of wiring chips on a PCB, the HF interface 126 and high speed data interface 128 can serve as a data and power link. This setup allows for a simple extension of devices.

While the invention has been described mostly in terms of ISO 14443 communication, the invention is not limited in this respect. The invention is applicable to any type of contactless communication.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A contactless communication device comprising:
an energy antenna configured to receive/transmit from/to a contactless communication partner a first carrier signal having a frequency in the high frequency (HF) range;
an energy interface which is coupled to the energy antenna and is configured to activate the contactless communication device and enable data communication between the contactless communication device and the contactless communication partner based on the first carrier signal;

a high speed data antenna configured to receive/transmit from/to the contactless communication partner a second carrier signal having a frequency greater than a frequency in the HF range; and a high speed data interface which is coupled to the high speed data antenna and is configured to enable data communication between the contactless communication device and the contactless communication partner subsequent to the enabled data communication by the energy interface and based on the second carrier signal.

2. The contactless communication device of claim 1, wherein the second carrier signal has a frequency in the ultra high frequency (UHF) range.

3. The contactless communication device of claim 1, wherein the energy interface is further configured to perform the activating upon detection of an energy pulse from the first carrier signal.

4. The contactless communication device of claim 3, wherein the high speed data interface is further configured to enable the data communication after the activation.

5. The contactless communication device of claim 3, wherein the energy interface is further configured to enable further data communication between the contactless communication device and the contactless communication partner based on the first carrier signal having the frequency in the HF range.

6. The contactless communication device of claim 1, wherein the energy interface is further configured to provide power to the contactless communication device or the contactless communication partner after the activation.

7. The contactless communication device of claim 1, wherein the energy interface is further configured to activate the high speed data interface.

8. The contactless communication device of claim 1, wherein the high speed data interface is further configured to be activated upon receipt of the second carrier signal from a high speed data interface of the contactless communication partner.

9. The contactless communication device of claim 1, further comprising a plurality of high speed data interfaces.

10. The contactless communication device of claim 1, wherein the contactless communication device is a contactless communication card, and the contactless communication partner is a contactless communication reader.

11. The contactless communication device of claim 1, wherein the contactless communication device is a contactless communication reader, and the contactless communication partner is a contactless communication card.

12. The contactless communication device of claim 1, wherein one of the contactless communication device and the contactless communication partner is a digital camera.

13. The contactless communication device of claim 1, wherein one of the contactless communication device and the contactless communication partner is a SIM card.

14. The contactless communication device of claim 1, wherein each of the contactless communication device and the contactless communication partner is an integrated circuit chip.

15. A method for contactless communication comprising:
receiving/transmitting from/to a contactless communication partner by an energy antenna a first carrier signal having a frequency in the high frequency (HF) range;
activating the contactless communication device and enabling data communication between the contactless communication device and the contactless communication partner based on the first carrier signal, by a contactless energy interface coupled to the energy antenna;

receiving/transmitting from/to the contactless communication partner by a high speed data antenna a second carrier signal having a frequency greater than a frequency in the HF frequency range; and enabling data communication between the contactless communication device and the contactless communication partner subsequent to the enabled data communication by the energy interface and based on the second carrier signal.

16. The method of claim 15, wherein the second carrier signal has a frequency in the ultra high frequency (UHF) range.

17. The method of claim 15, wherein the activating step comprises detecting an energy pulse from the first carrier signal.

18. The method of claim 15, further comprising providing power to the contactless communication device or the contactless communication partner after the activation, by the energy interface.

19. The method of claim 15, wherein the high speed data interface is further configured to enable the data communication after the activation.

20. The method of claim 15, further comprising:
enabling further data communication between the contactless communication device and a contactless communication partner based on a first carrier signal having a frequency in the HF range, by the energy interface.

21. The method of claim 15, further comprising activating the high speed data interface, by the energy interface.

22. The method of claim 15, further comprising activating the high speed data interface upon receipt of the second carrier signal from a high speed data interface of the contactless communication partner.

23. A contactless communication system comprising:
a reader comprising an energy antenna coupled to an energy interface and a high speed antenna coupled to a high speed data interface; and a device comprising an energy antenna coupled to an energy interface and a high speed data antenna coupled to a high speed data interface, wherein the device energy interface is configured to activate the device and enable data communication between the device and the reader based on a first carrier signal that is transmitted by the reader energy antenna, received by the device energy antenna, and has a frequency in the high frequency (HF) range, and wherein the reader high speed data interface and the device high speed data interface are configured to enable data communication between the reader and the device subsequent to the enabled data communication by the energy interface and based on a second carrier signal that is transmitted between the reader high speed data antenna and the device high speed data antenna and that has a frequency in a frequency range greater than the HF range.

* * * * *